(12) United States Patent
Kneer et al.

(10) Patent No.: US 10,494,159 B2
(45) Date of Patent: Dec. 3, 2019

(54) CONTAINER CLOSURE SYSTEM

(71) Applicant: Gaplast GmbH, Altenau (DE)

(72) Inventors: Stephan Kneer, Farchant (DE); Roland Kneer, Farchant (DE)

(73) Assignee: GAPLAST GMBH, Altenau (DE)

(*) Notice: Subject to any disclaimer, the term of this patent is extended or adjusted under 35 U.S.C. 154(b) by 48 days.

(21) Appl. No.: 15/668,869

(22) Filed: Aug. 4, 2017

(65) Prior Publication Data
US 2018/0037383 A1   Feb. 8, 2018

(30) Foreign Application Priority Data
Aug. 5, 2016  (DE) .................. 10 2016 009 484

(51) Int. Cl.
*B65D 51/30* (2006.01)
*B65D 25/10* (2006.01)
(Continued)

(52) U.S. Cl.
CPC .............. *B65D 51/30* (2013.01); *B29C 49/30* (2013.01); *B65D 25/10* (2013.01); *B65D 41/04* (2013.01); *B65D 41/0428* (2013.01); *B65D 47/043* (2013.01); *B65D 50/041* (2013.01); *B65D 51/20* (2013.01); *B65D 83/0481* (2013.01);
(Continued)

(58) Field of Classification Search
CPC .... B65D 51/30; B65D 50/041; B65D 47/043; B65D 83/0481; B65D 41/0428; B65D 25/10; B65D 51/20; B65D 41/04; B65D 2251/0093; B65D 2251/0015; B29C 49/30; B29C 49/04; B29C 49/06; B29C 49/76; B29L 2031/7158

USPC ....... 215/232, 294, 296, 299, 300, 329, 356, 215/357, 44; 220/359.1, 203.13, 787, 220/789, 537, 289
See application file for complete search history.

(56) References Cited

U.S. PATENT DOCUMENTS 2,551,937 A  *  5/1951  Gallagher ............ B65D 43/022
                                                            215/45
3,189,210 A  *  6/1965  Heisler .............. B65D 41/0435
                                                            215/260
(Continued)

FOREIGN PATENT DOCUMENTS

EP        0432916      6/1991
GB        2267076      11/1993
(Continued)

OTHER PUBLICATIONS

U.S. Appl. No. 15/668,853 entitled "Stopper for a Container", Inventor: Kneer, Stephan et al., filed Aug. 4, 2017.
(Continued)

*Primary Examiner* — Kareen K Thomas
(74) *Attorney, Agent, or Firm* — Greer, Burns & Crain, Ltd.

(57) ABSTRACT

The container system having a container and a screw-on cap that may that may be screwed onto the container and having an olive that is molded onto the screw-on cap and that is positioned against an annular edge area of the container opening is characterized in that the olive is molded onto the screw-on cap such that it fits against the exterior annular edge area of the container in a sealing manner, and in that the outer annular edge area has a continuously smooth surfaces.

5 Claims, 2 Drawing Sheets

(51) Int. Cl.

| | | |
|---|---|---|
| *B65D 47/04* | (2006.01) | |
| *B65D 50/04* | (2006.01) | |
| *B65D 83/04* | (2006.01) | |
| *B65D 41/04* | (2006.01) | |
| *B29C 49/30* | (2006.01) | |
| *B65D 51/20* | (2006.01) | |
| *B29C 49/76* | (2006.01) | |
| *B29C 49/04* | (2006.01) | |
| *B29C 49/06* | (2006.01) | |
| *B29L 31/00* | (2006.01) | |

(52) U.S. Cl.
CPC .............. *B29C 49/04* (2013.01); *B29C 49/06* (2013.01); *B29C 49/76* (2013.01); *B29L 2031/7158* (2013.01); *B65D 2251/0015* (2013.01); *B65D 2251/0093* (2013.01)

(56) References Cited

U.S. PATENT DOCUMENTS

| | | | | |
|---|---|---|---|---|
| 3,733,771 A | * | 5/1973 | Megowen | B65D 51/24 53/471 |
| 4,133,462 A | * | 1/1979 | Lindstrom | B65D 47/128 215/214 |
| 6,367,640 B1 | * | 4/2002 | Julian | B65D 1/0246 215/329 |
| 7,850,029 B2 | * | 12/2010 | Dreyer | B65D 41/0428 215/344 |
| 8,020,719 B2 | * | 9/2011 | Maiwald | B65D 47/0838 215/235 |
| 8,100,277 B1 | * | 1/2012 | Bush | B65D 41/045 215/305 |
| 8,342,344 B2 | * | 1/2013 | Livingston | B65D 41/325 215/214 |
| 9,580,212 B2 | * | 2/2017 | Graux | B67D 3/0032 |
| 2004/0256400 A1 | | 12/2004 | DeJonge | |
| 2005/0224520 A1 | * | 10/2005 | Janssen | B65D 47/2081 222/190 |
| 2007/0007232 A1 | | 1/2007 | Manera et al. | |

FOREIGN PATENT DOCUMENTS

| | | |
|---|---|---|
| WO | 2003011699 | 2/2003 |
| WO | 2007130608 | 11/2007 |

OTHER PUBLICATIONS

U.S. Appl. No. 15/668,845 entitled "Container Closure System", Inventor: Kneer, Stephan et al., filed Aug. 4, 2017.
Search Report, German Patent Office, German Application No. 10 2016 009 484.2, dated Jan. 13, 2017.
Search Report, European Patent Office, EP 17 00 1261, dated Nov. 22, 2017.

* cited by examiner

CONTAINER CLOSURE SYSTEM

PRIORITY CLAIM

The subject application claims convention priority to German patent application No. 10 2016 009 484.2 filed Aug. 5, 2016.

FIELD OF THE INVENTION

The invention relates to container closure systems.

SUMMARY OF THE INVENTION

The invention relates to a container closure system having a container and a screw-on cap that may be screwed onto the container and having an olive that is molded onto the screw-on cap and that is positioned against an annular edge area of the container opening. The container preferably is in the shape of a bottle having a bottle neck, but it may also be in the shape of a tube having a constant radius.

The olive has the task of completely sealing the container, so when the screw-on cap is screwed on the olive is pressed securely against the edge area of the container.

In the previously known systems of the type being considered, the circular olive is molded on at a location of the screw-on cap such that the olive engages in the container opening and is sealingly positioned against the inner annular edge area of the container opening. This is problematic if, after filling, the container opening of the container is to be sealed with a film, preferably an aluminum film, that is glued or welded to the upper edge of the container wall. In such a case, if the screw-on cap were to be screwed on to its end position on the container neck, the olive would puncture the sealing film. In the past, this problem has been solved in that a tamper-evident ring is attached to the lower edge area of the screw-on cap and limits the ability of the screw-on cap to be screwed on such that the olive remains above the sealing film. If the container is to be used, the sealing film and the tamper-evident ring are removed, whereupon the screw-on cap may then be screwed onto the container neck such that the olive is positioned interiorly against the annular edge area of the container opening. This is associated with considerable complexity in the manufacture of the screw-on cap and handling of the container closure system.

The underlying object of the present invention is to improve a container closure system such that the drawbacks delineated above are avoided.

This object is attained by a container closure system having a container and a screw-on cap that may be screwed onto the container and having an olive that is molded onto the screw-on cap and that is positioned against an annular edge area of the container opening. The olive is molded onto the screw-on cap at such a position that it fits against the exterior annular edge area of the container in a sealing manner, and the outer annular edge area has a continuously smooth surface without seams. Advantageous embodiments of the invention are described herein below.

The invention provides that the olive is molded onto the interior of the screw-on cap at a position such that it fits against the exterior annular edge area of the container, and provides that the exterior annular edge area has a continuously smooth surface. This is especially advantageously attained in that the container is manufactured in the extrusion blow molding process or injection blow molding process such that no mold release for the two blow mold halves occurs at the exterior annular edge area of the container.

This exterior olive seals the interior of the container just as securely as a conventional interior olive, since it is positioned in a sealing manner over the entire circumference of the container due to the continuously smooth surface of the exterior annular edge area of the container. This would not be possible with conventional containers manufactured with extrusion blow molding or injection blow molding, since the latter have two seams on the exterior annular outer edge, which seams are unavoidably left behind after the mold is released due to the blow mold halves that must be opened and closed.

It is particularly advantageous in this embodiment that the container opening is sealed by a removable film that is welded or glued to the outer edge of the container opening, since the film is disposed radially interior to the exterior olive. It is preferably provided that the outer diameter of the film is somewhat smaller than the interior diameter of the olive at the same height.

Assembly of the inventive closure system is also simplified because the film may be inserted into the screw-on cap, wherein once the screw-on cap has been screwed completely onto the bottle, the film may be attached to the edge of the container opening through the screw-on cap, preferably by induction welding.

The inventive blow mold for manufacturing a container having the continuously smooth exterior annular edge area includes a special blow mandrel that is connected to a radially exterior, continuously annular element that is radially spaced apart from the actual blow mandrel and that delimits on the blow mandrel an annular gap in which the edge area of the container opening is molded. Since the annular element has a smooth interior wall over its entire circumference, a seam-free support surface for the exterior olive is formed in this manner. This is significantly less complex than embodying an additional tamper evident ring on the screw-on cap.

According to another or special aspect of the invention, it is additionally suggested that a blocking element having a suspension device is attached to the interior wall of the container neck such that the blocking element is arranged beneath the container neck. The blocking element having the suspension device forms a dispensing aid with which it is prevented that a large number of solid content bodies, especially capsules, dragées, or tablets, fall out when the opened container is inverted, wherein the excess pieces must be returned to the container. In this situation, e.g., tablets may be damaged or contaminated if they inadvertently fall onto the floor.

So that the dispensing aid reduces the number of pieces falling out of the open container, it is provided that the suspension device has holes for container content pieces, wherein each of the holes is smaller than the diameter of the container neck. The suspension device preferably includes a ring that is preferably connected to the blocking element by bars whose spacing from one another delimits the holes.

If the container is in the shape of a bottle having a bottle neck, it is advantageously provided that the blocking element and the suspension device, preferably the ring having bars distributed around the circumference, have an equal exterior diameter that is essentially equal to the interior diameter of the bottle neck. The ring is preferably inserted into an interior annular groove of the bottle neck, to which end the ring, using weak spots, may be pressed together and then in the annular groove may elastically return to its original annular form.

The blocking element may have any desired shape, wherein what is essential is that the content pieces may not pass through the blocking element. The blocking element may have the shape of a disk that is preferably vaulted upward or upwardly conical.

It may be provided particularly advantageously that the blocking element is embodied as a chamber that is filled with desiccant.

The dispensing aid may also be inserted into a tube-shaped container, wherein in this case the blocking element has a smaller radius than the tube.

The inventive container closure system having the exterior olive may be embodied with or without sealing film on the edge of the container opening and with or without the dispensing aid described in the foregoing.

Additional details of the invention may be found in the following description of a preferred embodiment of the container closure system and of an essential part of an inventive blow mold for manufacturing the container.

DETAILED DESCRIPTION OF PREFERRED EMBODIMENTS

Figure 1:
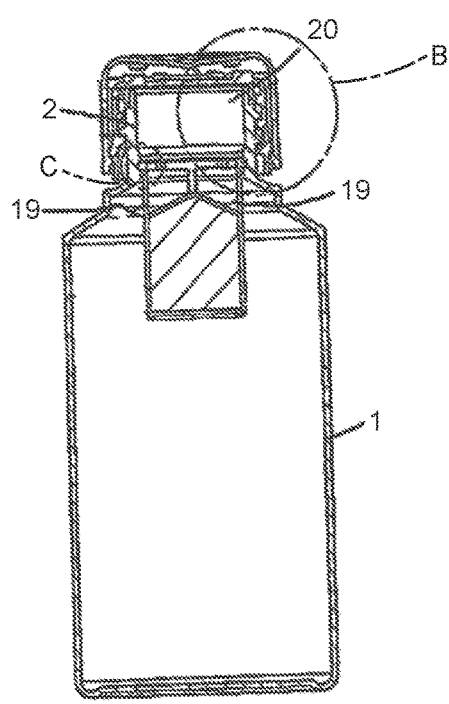
FIG. 1 is a center longitudinal section through a container closure system.
Figure 2:
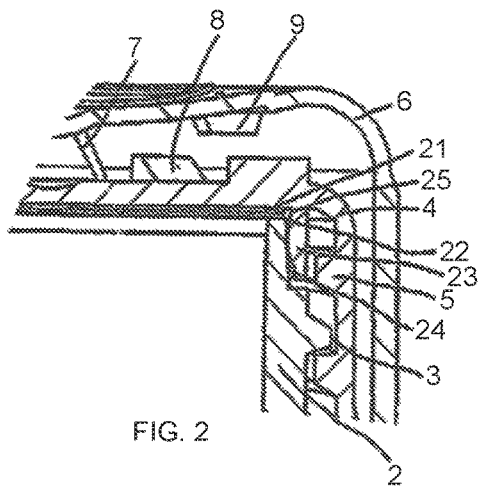
FIG. 2 is an enlarged depiction of detail B in FIG. 1.
Figure 3:
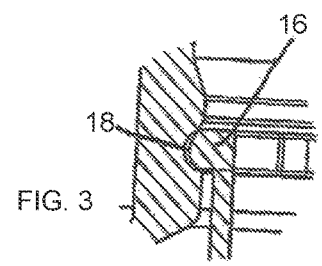
FIG. 3 is an enlarged depiction of detail C in FIG. 1.
Figure 4A:
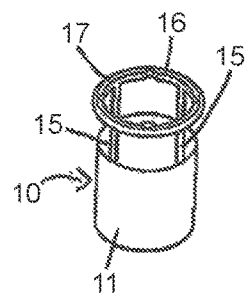
FIG. 4a is a perspective elevation of a dispensing aid.
Figure 4B:
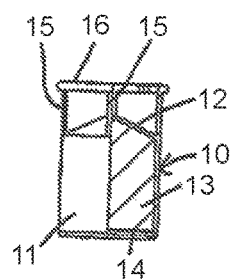
FIG. 4b is a partially cut-away side view of the dispensing aid.

A bottle-shaped container 1 includes a container neck 2 having a male thread 3 onto which is screwed a screw-on cap 4 having a female thread 5. A child-proof cap 6 is snapped onto the screw-on cap 4, and as depicted is seated freely rotatable on the screw-on cap 4. If the child-proof cap 6 is pressed downward against the force of elastic bars 7, teeth 8, 9 on the screw-on cap 4 and on the bottom of the child-proof cap 6 engage in one another such that the screw-on cap 4 may be rotated.

A dispensing aid 10 includes a blocking element 11 that includes an upper conical closing wall 12 and is embodied as a chamber filled with desiccant 13. The lower end of the chamber is sealed by a cardboard disk 14.

The blocking element 11 is connected via four parallel bars 15 to an attaching ring 16, wherein the bars 15 are spaced evenly from one another circumferentially. The ring 16 has four radially inward recesses 17 that are likewise spaced evenly from one another and that permit the ring 16 to be compressed radially.

The ring 16 is snapped into an inner annular groove 18 in the bottle neck 2 and retains the blocking element 11 below the bottle neck. The bottle neck 2 and the bars 15 delimit constricted holes 19 for individual capsules.

Prior to the container closure system being used, the container opening 20 is sealed using an aluminum film 21 that is attached to the upper edge 22 of the container neck 2 using induction welding.

An olive 23 is molded onto the bottom of the screw-cap 4 at a radially exterior position such that the radially inward bulge of its olive is positioned immediately against the exterior annular edge area 24. A small annular gap 25 remains between the exterior edge of the film 21 and the exterior olive 23.

Figures 5A, 5B, 6:
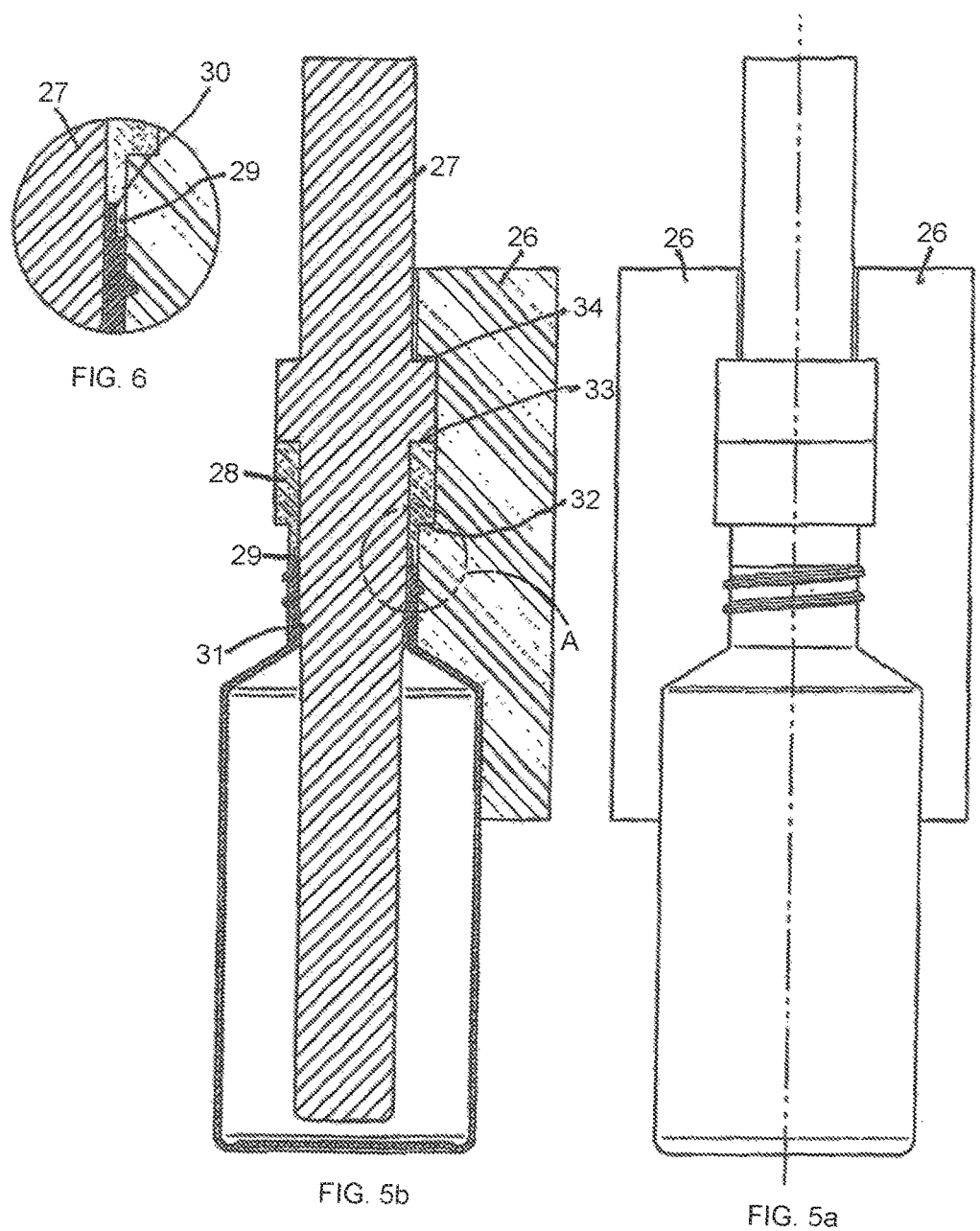
FIG. 5a is an elevation of a part of a blow mold.
FIG. 5b is a section through the part of the blow mold.
FIG. 6 is an enlarged depiction of detail A in FIG. 5b.

FIG. 5 depicts a blow mandrel 27 that is surrounded by an annular blow mandrel part 28 that includes an annular element 29 that delimits an annular gap 30 between itself and the exterior of the blow mandrel 27. The edge area of the container opening 20 is embodied in this annular gap 30 and thus has smooth continuous surfaces both on its interior and on its exterior. The blow mandrel 27 also has a small annular bulge 31 that is used to embody the annular groove 18 in the interior wall of the container opening.

The blow mold part 28 also includes two radially exterior annular shoulders 32, 33 with which it fits against corresponding annular shoulders of the two blow mold halves 26 and of the blow mandrel 27. When the blow mold halves 26 are closed, another annular shoulder 34 of the blow mandrel is positioned against an associated annular shoulder of the blow mold halves when they are closed.

The invention claimed is:

1. A container closure system comprises
a container having an opening with an exterior annular edge area, and
a screw-on cap that may be screwed onto the container, the cap having an olive that is molded onto the screw-on cap and that is configured to be positioned against the annular edge area of the container opening, wherein the olive is molded onto the screw-on cap at such a position that it fits against the exterior annular edge area of the container in a sealing manner, and
the exterior annular edge area has a continuously smooth surface without seams;
wherein the container is manufactured in the extrusion blow molding process or injection blow molding process comprising two blow mold halves such that no mold release for the two blow mold halves occurs at the exterior annular edge area of the container.

2. The container closure system according to claim 1, wherein the container opening is sealed by a removable film that is welded or glued to the outer edge of the container opening and the outer diameter of the film is smaller than the interior diameter of the olive at the same height.

3. The container closure system according to claim 1, wherein a blocking element having a suspension device is attached to the interior wall of the container neck such that the blocking element is arranged beneath the container neck, and in that the suspension device has holes that are smaller than the diameter of the container neck.

4. The container closure system according to claim 3, wherein the container is in the shape of a bottle having bottle neck, and in that the blocking element and the suspension device have an equal exterior diameter that is essentially equal to the interior diameter of the bottle neck.

5. The container closure system according to claim 3, wherein the blocking element is a desiccant chamber.

* * * * *